United States Patent [19]
Kominami

[11] Patent Number: 5,922,966
[45] Date of Patent: Jul. 13, 1999

[54] AIR-PACK TYPE CONTACT PRESSURE MEASURING METHOD

[75] Inventor: Yukiya Kominami, Tokyo, Japan

[73] Assignee: AMI Co. Ltd, Tokyo, Japan

[21] Appl. No.: 08/973,052

[22] PCT Filed: Mar. 28, 1996

[86] PCT No.: PCT/JP96/00823

§ 371 Date: Jan. 20, 1998

§ 102(e) Date: Jan. 20, 1998

[87] PCT Pub. No.: WO97/36156

PCT Pub. Date: Oct. 2, 1997

[51] Int. Cl.⁶ .................................. G01L 7/02; G01L 7/10
[52] U.S. Cl. ................................................................ 73/731
[58] Field of Search ................................. 73/729.2, 730, 73/731; 340/612, 614, 618; 128/886; 338/4

[56] References Cited

U.S. PATENT DOCUMENTS

| 4,052,903 | 10/1977 | Thodarson | 73/731 |
| 5,260,692 | 11/1993 | Claén | 73/731 |

FOREIGN PATENT DOCUMENTS 6-50828  2/1994  Japan .

OTHER PUBLICATIONS

J.P.O. Patent Bulletin 64P1744 Abstract & Drawing of 6–50828(A) Published Feb. 25 1994.
J.P.O. Patent Bulletin 163 P1333 Abstract & Drawing of 3–29633(A) Published Dec. 27, 1991.
J.P.O. Patent Bulletin 30P1203 Abstract & Drawing of 3–46533(A) Published Feb. 27 1991.

*Primary Examiner*—William Oen
*Attorney, Agent, or Firm*—Robert W. J. Usher

[57] ABSTRACT

While a bag (1) made of a thin, soft, and less elastic material is packed with air and is positioned between contacts of soft materials, a thin tube (2) from the bag (1) is lead to the outside of the contacts, and the pressure difference with respect to atmosphere is measured, whereby the contact pressure of an elastic body can be measured. As water depth (A) (mmH$_2$O) is measured while the bag (1) is horizontally sank into the water, and as water temperature is changed while the water temperature is measured, the measured level can be calibrated together with thermal influence.

16 Claims, 2 Drawing Sheets

ര5,922,966

AIR-PACK TYPE CONTACT PRESSURE MEASURING METHOD

TECHNICAL FIELD

The present invention relates to contact pressure measurement concerning soft materials such as external pressure applied to a human body in garments such as clothes, on a chair, in bedclothes, on a bed, and the like; and a measuring method in which a bag packed with air is held between contacts, the pressure of the air is measured over time, and thus measured value may be calibrated.

BACKGROUND ART

Conventionally, in the contact pressure measurement for soft materials, there have been no measuring instruments which are accurate and have a reproducibility. This is because the state and phenomenon of soft surfaces at the time of contact cannot be comprehended, for example. Also, calibration method for confirming their accuracy has not actually been established yet, thus making it impossible to judge whether each measuring instrument is good or bad.

For example, since strain gauge sensor system is a flat solid sensor, it has detected a bending stress even when it is simply attached to the surface of a site in a curved surface of a human body, and has yielded errors due to surface movement and shifting therebetween when they come into contact with each other and due to hindrance to each other upon expansion and compression. On the other hand, electric resistance system, which measures changes in electric resistance upon compression of an electrically conductive material, is disadvantageous in that its material is uneven, restoration after compression is slow, and reaction, i.e., resolution, upon strong compression is rough. There have been cases where this system is used with units indicated for these characteristics.

In liquid-pressure equilibration system, which is likely to be considered similar to the present invention, a bag in a pressure-receiving section is packed with a liquid. Here, zero correction is necessary for a pressure sensor, which is connected thereto via a tube, as well as its altitude. If their relative height with respect to each other changes after the correction, an error will occur. Also, it is unsuitable for dynamic measurement. It is because load generated upon acceleration yields an error with respect to the weight of the packed liquid.

Even in the case of a pressure-receiving sensor in which a bag is packed with air as with the present invention, when the bag uses an elastic material, the area of the surface to be measured always changes according to a contact strength, thus failing to achieve comparative measurement. In addition, commonly among the above-mentioned measurement systems, there is a pressure-receiving method in which the pressure-receiving section is formed like interconnected sheets or lattices so as to cover the contact surface. In this case, the soft surface may be restrained from changing its curvature or expanding and compressing itself, thereby yielding a measured value different from the actual contact state.

DISCLOSURE OF THE INVENTION

The present invention can accurately measure contract pressure of a soft surface and perform calibration for confirming the reproducibility and accuracy of thus measured value.

A bag made of a thin, soft, and less elastic material is packed with air; and is disposed between contacts, while being lead to the outside of the contacts via a tube, whereby a contact force can be measured as a pressure when a pressure difference between the air and a pressure within the bag is measured. The accuracy of the value measured under this measurement condition is confirmed by water pressure mmH$_2$O as the bag is horizontally sank into water. Also, as the water temperature is changed, thermal influence can be observed.

BEST MODES FOR CARRYING OUT THE INVENTION

In order to describe the present invention in further detail, it will be explained with reference to the accompanying drawings.

Figure 1:
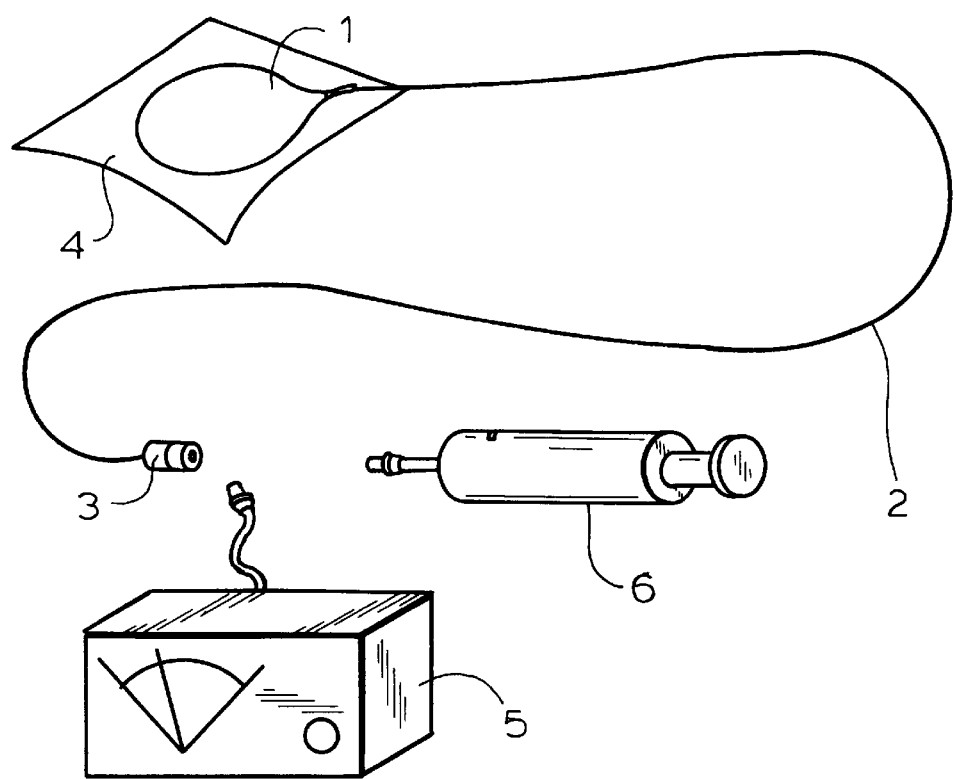
FIG. 1 is an overall configurational view showing a measuring method of the present invention.

In FIG. 1, a pressure-receiving section comprises a bag 1 made of a soft, nonelastic material; a tube 2, attached thereto, which does not collapse upon being pressed; and a joint 3. The bag 1 is provided with a film 4 to be attached to a site, whereas a pressure gauge 5 incorporates therein a pressure sensor for detecting a pressure difference between the atmosphere and the bag 1. An injection cylinder 6 injects a predetermined amount of air into the bag 1. After the injection, the joint 3 is connected to the pressure gauge 5, thus attaining a state ready for measurement. For the measurement, the bag 1 is attached between contacts via the attaching film 4 so that the surfaces of the bag 1 totally abut to the contacts. Accordingly, the measurement can be performed while the bag 1 is attached without being pressed. Here, the attachment film 4 is also effective in protecting the bag 1 from shifting and abrading.

Thus, in order to measure a soft surface, by use of a soft pressure-receiving section, following a curved surface for measurement, the bag 1 made of a nonelastic material whose measuring object does not expand upon strong pressure is packed with air which is free from altitude difference and influence of acceleration, and is lead to the outside of the contacts via the thin tube 2 that does not impart any thickness influence of the pressure-receiving section to the measuring surface. Then, the pressure difference with respect to the atmosphere is measured by the pressure gauge 5 so as not to be influenced by opening/closing of a door or changes in atmospheric pressure upon weather. Though it is likely to be considered that a large error may occur due to thermal influence from the site or the like when the pressure is measured with air, it can be seen from the calibration method of FIG. 3 that such an error is very small.

On the other hand, according to the amount of air injected into the bag 1, the range of measurement is determined as follows. In the case where the amount is smaller than the maximum volume of the bag 1, when the bag 1 has an excess space corresponding to a volume of air expanding due to the heat from the site or the like, the lower measurable limit is zero, whereas the upper limit is a state where the bag 1 completely collapses. In the case where air is injected into the bag 1 by the maximum volume of the bag 1 or more, the lower measurable limit is a pressure level at the time when the air volume including the thermally expanding volume is reduced upon compression to a level not higher than the maximum volume of the bag 1, whereas the upper limit is a state where the bag 1 completely collapses. Accordingly, the lower measurable limit is a state where the air injected into the bag 1 is being pressed not by the bag 1 but by the mutual contacts. The bag 1 at that time is wrinkled and reduces its volume, thereby functioning to prevent the flatly-expanding air from escaping therefrom. Here, the concentrating stress, changes in curvature, and the like according to the thickness of the bag 1 injected with the air are considered to be allowable errors.

Consequently, the contact force of a soft material alleviated by absorption of its softness per se, deformation thereof, surface tension of the coating, and the like is always transmitted as a pressure to the air within the bag 1 confined between the contacts, and is guided via the tube 2 so as to be measured by the pressure sensor.

Figure 2:
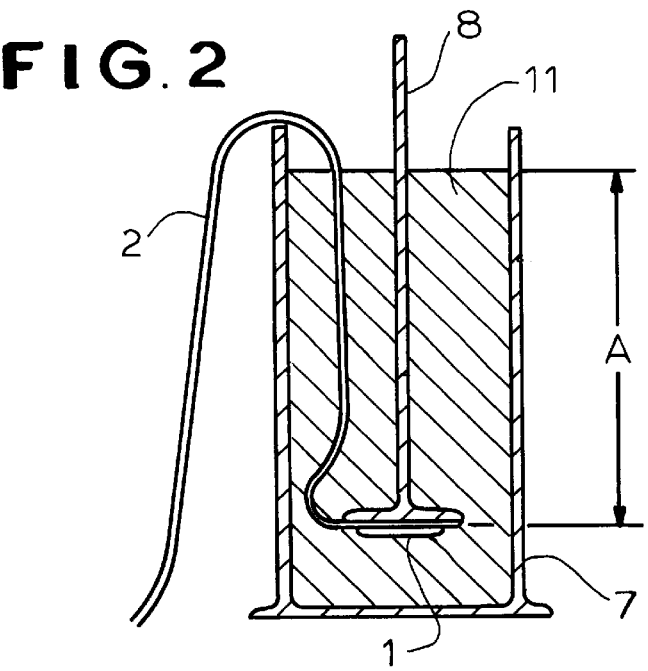
FIG. 2 is a sectional view showing pressure calibration by water pressure.

FIG. 2 shows a method of calibrating thus measured pressure level, in which water 11 is introduced into a measuring cylinder 7, the bag 1 is attached to a bottom plate of a T-shaped stick 8 so as to be sank into the water horizontally, and a water depth A to the bag 1 is measured and then is calibrated in terms of mmH$_2$O. Water 11 is used for calibration in order to prevent contact resistance from occurring in a surface which expands or compresses itself or whose curvature changes. Such contact resistance may occur due to friction, adhering force caused by moisture, adhering force caused by static electricity, and the like, and has no reproducibility or is hard to reproduce. This calibration eliminates such resistance and applies a uniform pressure on a horizontal plane. Also, when temperature of water is changed, thermal influence can easily be seen. Here, though a gas might be used as being pressurized within a chamber, the gas is disadvantageous in that it yields a uniform pressure within the whole chamber, whereby deformation of the pressure-receiving section to be calibrated, errors in thickness, and the like cannot be seen, while it is unlikely to yield a uniform temperature change.

Figure 3:
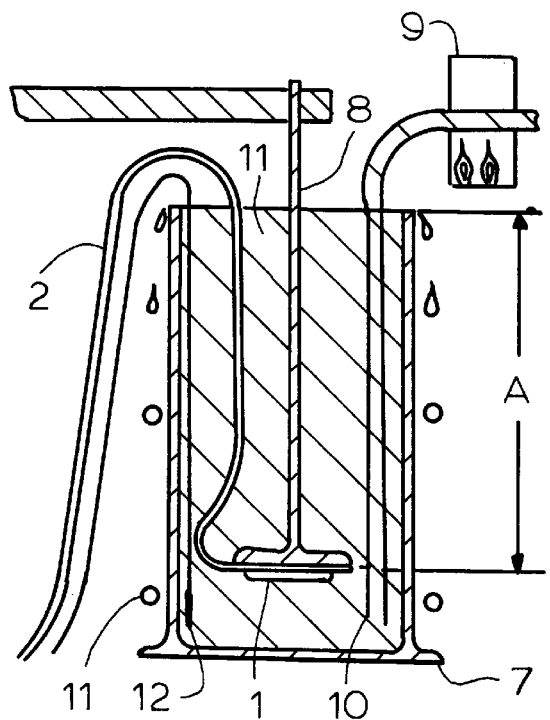
FIG. 3 is a sectional view for observing a correlation between pressure and temperature.

In FIG. 3, a tap 10 of a water heater 9 is guided to the bottom of the measuring cylinder 7, While water 11 is kept spilling over little by little, and the water temperature is being measured by a temperature sensor 12, the bag 1 is attached to the bottom plate of the T-shaped stick 8 and sank into the water, and then the T-shaped stick 8 is fixed. The temperature of water 11 is changed by the water heater 9, and a correlation between temperature and pressure is observed.

Figure 4:
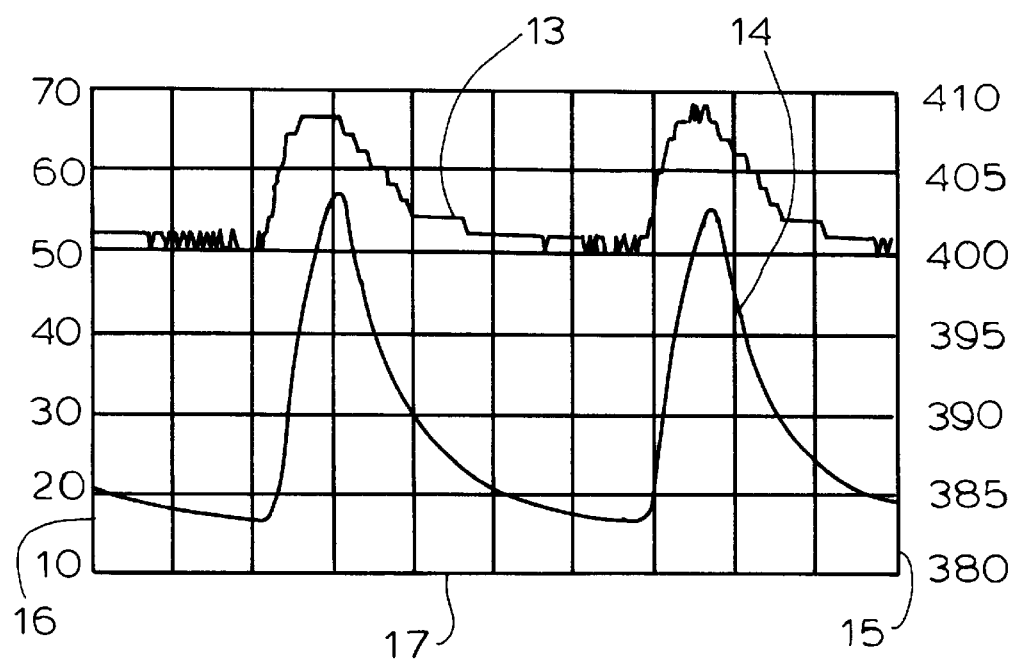
FIG. 4 is a graph showing the correlation between pressure and temperature measured in FIG. 3.

FIG. 4 is a graph showing values measured in FIG. 3. Here, pressure scale 15 whose unit is mmH$_2$O, temperature scale 16 whose unit is °C., and elapsed time 17 indicate the correlation between pressure change 13 and water temperature change 14. The thermal influence can be observed as a pressure error not higher than 10 mmH$_2$O between 17° C. and 57° C.

INDUSTRIAL APPLICABILITY

Since calibration is also provided in the foregoing measuring method, with a high reliability in measured values, pressure and contraction can be numerically expressed. For example, the present invention is applicable to the field of measurement where it is necessary to clarify not only values depending on difference in softness, values depending on change in curvature, contact resistance caused by change in moisture such as sweat and rain, values depending on change in elasticity; but also digitization of external pressure influencing each circulatory organ within the body, relationship between pressure time and pressure level, relationship between pressure area and pressure level, and the like under a familiar living environment.

It is also applicable to measuring instruments for indicating softness of sponge or the like and cushioning property of bedclothes, chair, or the like.

I claim:

1. A method of detecting a correction value for air-pack type contact pressure measurement, said method comprising the steps of:

preparing a bag (1) made of a thin, soft, and less elastic material connected to a thin pressure-resistant tube (2);

injecting a predetermined amount of air into said bag (1);

sinking said bag (1), in a horizontal state, to a predetermined depth position into a container (7) containing water;

supplying at a predetermined rate into said container (7) water whose temperature is externally controlled and discharging water from within said container (7) at said rate so as to keep the depth of said bag (1) constant;

in thus attained state, detecting water temperature near said bag (1) and measuring an air pressure within said bag (1) by a pressure gauge (5), so as to detect a relationship between the pressure within said bag (1) and ambient water temperature, thereby obtaining temperature correction data for a result of measurement effected by said pressure gauge (5).

2. The method according to claim 1, wherein means for heating the water externally supplied into said container (7) is provided, said heating means effecting temperature control of said water.

3. The method according to claim 1, wherein said temperature-controlled water is supplied to a bottom portion in said container (7) at said predetermined rate, while water is discharged from within said container (7) via an upper portion thereof at said rate.

4. The method according to claim 2, wherein said temperature-controlled water is supplied to a bottom portion in said container (7) at said predetermined rate, while water is discharged from within said container (7) via an upper portion thereof at said rate.

5. The method according to claim 1, wherein a pressure applied to said bag (1) is determined from the depth position of said bag (1) within said container (7), and thus determined pressure is compared with a value detected by said pressure gauge (5), so as to calibrate said pressure gauge (5).

6. The method according to claim 2, wherein a pressure applied to said bag (1) is determined from the depth position of said bag (1) within said container (7), and thus determined pressure is compared with a value detected by said pressure gauge (5), so as to calibrate said pressure gauge (5).

7. The method according to claim 3, wherein a pressure applied to said bag (1) is determined from the depth position of said bag (1) within said container (7), and thus determined pressure is compared with a value detected by said pressure gauge (5), so as to calibrate said pressure gauge (5).

8. The method according to claim 4, wherein a pressure applied to said bag (1) is determined from the depth position of said bag (1) within said container (7), and thus determined pressure is compared with a value detected by said pressure gauge (5), so as to calibrate said pressure gauge (5).

9. An apparatus for detecting a correction value for air-pack type contact pressure measurement, said apparatus comprising:

a bag (1) made of a thin, soft, and less elastic material connected to a thin pressure-resistant tube (2) having a joint (3) at a tip thereof;

an injection cylinder (6) connectable to said joint (3) and adapted to inject a predetermined amount of air into said bag (1) via said joint (3) and tube (2);

a pressure gauge (5) connectable to said joint (3) and adapted to measure a pressure within said bag (1) via said joint (3);

a container (7) containing water adapted to sink said bag (1) in a horizontal state therein;

water supplying and discharging means for supplying at a predetermined rate into said container (7) water whose temperature is externally controlled and discharging water from within said container (7) at said rate so as to keep a depth of said bag (1) constant; and temperature detecting means for detecting water temperature near said bag (1) sunk into said container (7);

wherein, in a state where said bag (1) is sunk at a predetermined depth position within said container (7), said water supplying and discharging means supplies and discharges water, and said pressure gauge (5) measures an air pressure within said bag (1), so as to detect a relationship between the pressure within said bag (1) and ambient temperature, thereby obtaining temperature correction data for a result of measurement effected by said pressure gauge (5).

10. The apparatus according to claim 9, wherein said water supplying and discharging means has means for heating the water externally supplied into said container (7), said heating means effecting temperature control of said water.

11. The apparatus according to claim 9, wherein said water supplying and discharging means supplies said temperature-controlled water to a bottom portion in said container (7) at said predetermined rate and discharges water from within said container (7) via an upper edge thereof at said rate.

12. The apparatus according to claim 10, wherein said water supplying and discharging means supplies said temperature-controlled water to a bottom portion in said container (7) at said predetermined rate and discharges water from within said container (7) via an upper edge thereof at said rate.

13. The apparatus according to claim 9, wherein a pressure applied to said bag (1) is determined from the depth position of said bag (1) within said container (7), and thus determined pressure is compared with a value detected by said pressure gauge (5) so as to calibrate said pressure gauge (5).

14. The apparatus according to claim 10, wherein a pressure applied to said bag (1) is determined from the depth position of said bag (1) within said container (7), and thus determined pressure is compared with a value detected by said pressure gauge (5) so as to calibrate said pressure gauge (5).

15. The apparatus according to claim 11, wherein a pressure applied to said bag (1) is determined from the depth position of said bag (1) within said container (7), and thus determined pressure is compared with a value detected by said pressure gauge (5) so as to calibrate said pressure gauge (5).

16. The apparatus according to claim 12, wherein a pressure applied to said bag (1) is determined from the depth position of said bag (1) within said container (7), and thus determined pressure is compared with a value detected by said pressure gauge (5) so as to calibrate said pressure gauge (5).

* * * * *